United States Patent [19]

Kerr et al.

[11] 4,079,121
[45] Mar. 14, 1978

[54] COMPLEXES OF BETA PLATINUM CHLORIDE AND AMMONIA

[75] Inventors: George T. Kerr, Lawrence Township, N.J.; Albert E. Schweizer, Levittown, Pa.

[73] Assignee: Mobil Oil Corporation, New York, N.Y.

[21] Appl. No.: 675,099

[22] Filed: Apr. 9, 1976

Related U.S. Application Data

[62] Division of Ser. No. 532,445, Dec. 13, 1974, abandoned.

[51] Int. Cl.$^2$ ...................... C01B 21/00; C01G 55/00
[52] U.S. Cl. .................................. 423/413; 75/.5 BB; 252/466 PT; 423/351; 423/470; 423/481; 423/491; 423/500
[58] Field of Search .................. 423/22, 462, 463, 413

[56] References Cited

PUBLICATIONS

J. W. Mellor's, "A Comp. Treatise on Inorganic and Theo. Chem.", vol. 16, p. 255, Longmans, Green & Co., N. Y.

C. A. Jacobson's, "Encyclopedia of Chem. Reactions", vol. 5, 1953, p. 462, Chapman & Hall, New York.

*Primary Examiner*—Edward Stern
*Attorney, Agent, or Firm*—Charles A. Huggett; Thomas S. Szatkowski

[57] ABSTRACT

This invention relates to reactions of beta platinum chloride with gaseous ammonia to yield metallic platinum useful in catalysis and other operations and also complexes of beta platinum chloride and ammonia, which complexes are considered to be new compositions and which are contemplated as being useful in cancer research.

3 Claims, No Drawings

COMPLEXES OF BETA PLATINUM CHLORIDE AND AMMONIA

CROSS REFERENCES TO RELATED APPLICATIONS

This application is a division of application Ser. No. 532,445, filed Dec. 13, 1974, now abandoned.

BACKGROUND OF THE INVENTION

1. Field of the Invention

This invention relates to reaction of beta platinum chloride with gaseous ammonia to yield metallic platinum or useful addition complexes characterized by the formula $PtCL_2 \cdot X\,NH_3$ where X is greater than zero up to about 2.

2. Description of the Prior Art

It has been reported by W. Peters in Z. Anorg. Chem. 77 (1912) p. 137 et seq. that $PtCl_2$, prepared from thermally decomposing chloroplatinic acid, reacts with gaseous ammonia to produce a compound $PtCl_2 \cdot 5NH_3$. In carrying out such reaction, Peters exposed anhydrous $PtCl_2$ to ammonia very slowly and maintained the solid at approximately room temperature by regulating the flow of ammonia. The material prepared by Peters is distinct from the compounds described herein. Insofar as is known, the reduction of beta platinum chloride with gaseous ammonia to yield metallic platinum, which offers a convenient method for synthesis of supported platinum metal catalysts, has not been reported.

Crystalline platinum compounds having the empirical formulae $Pt(NH_3)Cl_2$ and cis trans $Pt(NH_3)_2Cl_2$ have been respectively reported by Kerr et al. Inorg. Chem., 13 2294 (1974) and Watt et al. Journal of Electrochem. Soc. 110, 716 (1963). The compounds described herein formed by the direct reaction of beta platinum chloride and ammonia gas characterized by the same empirical formulas but different crystalline structure or the absence of crystallinity, e.g. amorphous solids, have not been reported.

SUMMARY OF THE INVENTION

In accordance with the present invention, it has been found that beta platinum chloride can conveniently be prepared by thermal decomposition of chloroplatinic acid in flowing air or an inert gas atmosphere and subsequently reacted with gaseous ammonia to yield metallic platinum or addition complexes having a composition represented by the formula $PtCL_2 \cdot X\,NH_3$ where X is a number greater than zero but not greater than about 2.

Platinum chloride is known to exist in two different crystalline forms, namely alpha and beta. The structure of the alpha form has not been published. The beta form contains discrete $Pt_6Cl_{12}$ units and is volatile. Beta platinum chloride can readily be synthesized by decomposing chloroplatinic acid at a temperature in the range of 275° to 450° C. in air or an inert gas such as nitrogen, argon or helium. Decomposition is believed to proceed typically in accordance with the following equation:

$$(H_3O)_2PtCl_6 \cdot 2.3\,H_2O \rightarrow \beta\text{-}PtCl_2 + 2Cl_2 + 4.3\,H_2O + 2HCl$$

The beta platinum chloride so produced is, in accordance with the process of the invention, contacted with gaseous ammonia, suitably at about room temperature, e.g. about 25° C. A highly exothermic reaction takes place with the formation of a white powder identified as ammonium chloride. The temperature is then raised to about 400° C. during which considerable weight loss occurs over the range of 200° to 375° C. The final sample weight was that calculated for reduction of platinum chloride to metallic platinum. X-ray diffraction analysis confirmed that the final sample was metallic platinum. The reaction is believed to proceed in accordance with the following equation:

$$3\beta\text{-}PtCl_2 + 8\,NH_3 \rightarrow 3\,Pt + 6\,NH_4Cl + N_2$$

The vigorous reduction of beta platinum chloride with ammonia is surprising in view of its rather inert nature. Thus, it is known that beta platinum chloride is not readily soluble in water and essentially insoluble in benzene, chloroform, ethanol, acetone and acetic acid. In contrast to the ease of reduction of beta platinum chloride with ammonia to metallic platinum, it has been found that palladium chloride ($PdCl_2$) undergoes no reaction with ammonia at room temperature thereby indicating the much greater ease of reduction of $PtCl_2$ as compared with $PdCl_2$.

The above reaction of beta platinum chloride and gaseous ammonia may be carried out at a temperature between about 0° and about 450° C. and preferably between about 20° C. and about 300° C. As a practical embodiment, conduct of the reaction at approximately room temperature, i.e. about 25° C., is particularly preferred. Pressure during the reaction is within the range of about 0.5 to about 100 atmospheres, with approximately atmospheric pressure being preferred. The molar ratio of gaseous ammonia to beta platinum chloride is generally within the range of about 5 to 10 moles of $NH_3$ per mole of $\beta PtCl_2$.

When the pressure of ammonia is reduced to appreciably less than 0.5 atmosphere, i.e. in the approximate range of 0.05 to 0.3 atmosphere and preferably between about 0.1 and about 0.2 atmosphere, the beta platinum chloride reacts slowly with the ammonia at a temperature between about 0° and about 200° C. and preferably between about 20° and about 100° C. to form products whose compositions can be defined by the formula:

$$PtCl_2 \cdot X\,NH_3$$

where X is a number greater than 0 but not greater than about 4. The ammonia in the described complexes is chemically bound and not reversibly sorbed. Thus, the ammonia in $PtCl_2 \cdot NH_3$ is irreversibly reacted. Heating this solid at 200° C. for as long as 16 hours gave no change in composition. Heating above about 230° C. led to decomposition according to the reaction:

$$2\,PtCl_2 \cdot NH_3 \rightarrow 2\,Pt + N_2 + 4\,HCl + H_2$$

The X-ray diffraction pattern of the solid $PtCl_2 \cdot NH_3$ shows the same X-ray diffraction pattern as $\beta\text{-}PtCl_2$, i.e. the crystalline structure of $\beta\text{-}PtCl_2$ is retained. Apparently, the structure on $\beta\text{-}PtCl_2$ is open enough to accommodate up to 1 molecule of $NH_3$ per Pt atom. This diffraction pattern is distinct from that of the reported monoamine $Pt(NH_3)Cl_2$ prepared by the decomposition of trans $Pt(NH_3)_2Cl_2$. Exposing the solid $PtCl_2 \cdot NH_3$ to $NH_3$ gas up to 1 atmospheric pressure does not result in a strongly exothermic reaction. On the contrary, a slow uptake of $NH_3$ takes place. The uptake of ammonia is constant and continuous until a composition having the formula $PtCl_2 \cdot 2\,NH_3$ is obtained. The ammonia uptake continues yielding $PtCl_2 \cdot 3\,NH_3$ but at a decreasing rate as the composition approaches $PtCl_2 \cdot 4 NH_3$. The X-ray powder diffraction pattern of the compound $PtCl_2 \cdot 2 NH_3$ showed that it was amorphous, in contrast to the previously reported cis and trans $Pt(NH_3)_2Cl_2$. The solids having the compositions $PtCl_2 \cdot 3 NH_3$ and $PtCl_2 \cdot 4 NH_3$ obtained by the above procedure show the same X-ray powder diffraction patterns as the known complexes $Pt(NH_3)_3Cl_2$ and $Pt(NH_3)_4Cl_2$, although these latter compounds have not previously been prepared as a result of ammoniation of the amorphous $PtCl_2 \cdot 2 NH_3$.

The compounds $PtCl_2 \cdot X NH_3$ above-described where X is greater than zero but not greater than about 2 are considered new compositions and contemplated as being useful in cancer research. It is known that platinum ammine chlorides, i.e. $Pt(NH_3)_2Cl_2$, $Pt(NH_3)_3Cl_2$ and $Pt(NH_3)_4Cl_2$ are of interest in cancer chemotherapy. The platinum chloride-ammonia complexes of this invention having the formula $PtCl_2 \cdot X NH_3$ where X is greater than zero but not greater than about 2 differ from these previously known platinum ammine chlorides. Contact of the cis- and trans $Pt(NH_3)_2Cl_2$ with gaseous $NH_3$ at room temperature and 1 atmosphere pressure exhibited no reaction, further showing that $PtCl_2 \cdot 2 NH_3$ differs from these known isomers.

The described reduction of beta platinum chloride with ammonia to yield metallic platinum may desirably be effected in the presence of a porous refractory solid to yield supported platinum catalysts. Representative porous refractory solids include charcoal, graphite, clays, inorganic oxides such as those composed predominantly of silica and/or alumina or combinations of these oxides with oxides of the other elements. Other inorganic oxides may include titania, germania, zirconia, magnesia, as well as the oxides of calcium, nickel, cobalt, molybdenum or various combinations thereof. A particularly feasible catalyst made using the described technique is one where the platinum is deposited on a support comprising predominantly alumina. Such support may have combined therewith, minor proportions of halogens, e.g. chlorine and/or fluorine to yield platinum-containing catalysts suitable for the reforming, hydrogenation, isomerization or dehydrocyclization of petroleum hydrocarbons. Such catalyst may also contain a metal other than platinum, such as rhenium, inidium, gold, zinc, and the like introduced onto the support either before, after or during compositing of the support with platinum utilizing the technique described hereinabove.

DESCRIPTION OF SPECIFIC EMBODIMENTS

The following examples will serve to illustrate the invention and various embodiments thereof:

Example 1

Four grams of $H_2PtCl_6 \cdot 4.3H_2O$ were placed in an alumina container and heated to 300° C. over 4 hours in a helium gas purge. The purge gas rate was 200 cc/minute. The resulting product was identified as beta platinum chloride. The yield of $\beta$-$PtCl_2$ was 2.2 grams.

A small quantity (0.25 gram) of the beta platinum chloride prepared as described above was contacted with a stream of ammonia gas. An immediate, vigorous reaction occurred with a puff of white smoke. The black residue resulting from such reaction was determined by X-ray diffraction analysis to be metallic platinum.

Example 2

A reaction between beta platinum chloride and gaseous ammonia similar to that described in Example 1 was carried out on the balance pan of a thermogravimetric analyzer. A thermocouple was located about 5 mm. from the sample. The thermocouple showed a very large temperature rise occurred during the reaction to yield metallic platinum.

Examples 3

Using the thermogravimetric analyzer apparatus referred to in Example 2, a small sample (0.025 gram) of beta platinum chloride was contacted with an ammonia gas stream diluted with helium to about 0.1 atmosphere. The beta platinum chloride sample gained weight continuously with a small, i.e. 5° C. temperature rise observed with the thermocouple. When the sample weight corresponded to the composition $PtCl_2 \cdot NH_3$, the ammonia was discontinued and sample removed from the apparatus. X-ray diffraction analysis showed the resulting material to have the same X-ray diffraction pattern, i.e. the same crystal structure as beta platinum chloride. Larger amounts of samples of varying $NH_3$ content are prepared in a tube by passing dilute $NH_3$ in nitrogen over $\beta$-$PtCl_2$ for varying times.

Example 4

An approximately 2 gram sample of beta platinum chloride was contacted at room temperature in a tube with an ammonia gas stream diluted with helium to about 0.1 atmosphere for about 50 minutes to yield a product having the composition corresponding to $PtCl_2 \cdot 2 NH_3$. X-ray diffraction analysis of this product showed the same to be amorphous.

Example 5

Ten grams of eta-alumina were impregnated with 15 ml. of water to which 0.125 gram of $H_2PtCl_6$ was added. The resulting catalyst was then dried at 100° C. for 3 hours, followed by air calcination for 16 hours at 200° C. and 7 hours at 300° C. yielding beta platinum chloride. The catalyst was then contacted with gaseous ammonia at 300° C. for 15 minutes to yield a platinum-containing catalyst.

Example 6

The catalyst prepared as in Example 5 was tested for reforming activity. An isothermal micropressure unit was employed. The feedstock was a $C_6$ —200° F. naphtha. The reforming test was conducted at a temperature of 900°–930° F., a pressure of 200 psig at a liquid hourly space velocity of 4 in the presence of hydrogen at a 15:1 hydrogen to hydrocarbon ratio. The results obtained are shown in the table below.

| Component | Temp. ° F. | |
|---|---|---|
| (Wt. Percent) | 900 | 930 |
| Time On Stream (Hr.) | 17 | 41 |
| $C_1$ ⎫ $C_2$ ⎭ | 1.1 ⎫ ⎭ | 3.1 |
| $C_3$ | 1.3 | 3.4 |
| iso $C_4$ | 1.1 | 2.8 |
| n-$C_4$ | 0.8 | 2.1 |
| iso $C_5$ | 1.7 | 3.7 |
| n-$C_5$ | 1.6 | 2.5 |
| 2,2, Dimethyl $C_4$ | 2.0 | 1.8 |
| Cyclo $C_5$ ⎫ ⎭ | 1.1 ⎫ ⎭ | 1.1 |

| Component (Wt. Percent) | Temp. ° F. 900 | Temp. ° F. 930 |
| --- | --- | --- |
| 2,3, Dimethyl C$_4$ | | |
| 2 Methyl C$_5$ | 12.6 | 12.3 |
| 3 Methyl C$_5$ | 8.2 | 7.8 |
| n-C$_6$ | 13.1 | 10.0 |
| 2,2 Dimethyl C$_5$ | | 0.2 |
| Methyl Cyclo C$_5$ | 4.8 | 1.4 |
| 2,4, Dimethyl C$_5$ | | 0.4 |
| Benzene | 12.4 | 14.9 |
| 3,3 Dimethyl C$_5$ | 0.7 | 0.4 |
| Cyclo C$_6$ | 0.1 | — |
| 2 Methyl C$_6$ | 4.6 | 2.7 |
| 2,3 Dimethyl C$_5$ | 1.6 | 1.0 |
| 1,1 Trans, Dimethyl Cyclo C$_5$ | 0.1 | — |
| 3 Methyl C$_6$ | 5.6 | 3.2 |
| 1,3 Trans, Dimethyl Cyclo C$_5$ | 0.7 | |
| 1,3 Cis, Dimethyl Cyclo C$_5$ | 0.1 | 0.8 |
| 1,2 Trans, Dimethyl Cyclo C$_5$ | 0.3 | |
| n-C$_7$ | 4.5 | 2.3 |
| 1,2 Cis Dimethyl Cyclo C$_5$ | | |
| Methyl Cyclo C$_6$ | 0.5 | 0.3 |
| Ethyl Cyclo C$_5$ | | |
| Toluene | 17.5 | 19.4 |
| C$_8$+ | 1.9 | 2.4 |
| C$_5$+ | 95.7 | 88.6 |
| C$_5$+(R+O) | 76.0 | 83.4 |

From the above results, it will be seen that the manner of reducing beta platinum chloride with ammonia in the presence of a porous support such as alumina is a feasible method for producing an effective reforming catalyst.

We claim:

1. As a new composition, a material which is characterized by the formula:

$$PtCl_2 \cdot XNH_3$$

in which the ammonia is irreversibly reacted and where X is essentially 1 or 2; and when X is 1, the composition has an X-ray diffraction pattern which is the same as beta platinum chloride and distinct from monoamine Pt(NH$_3$)Cl$_2$, prepared by the decomposition of trans Pt(NH$_3$)$_2$Cl$_2$ and when X is 2, the composition is an isomer and amorphous, in contrast to the crystalline platinum compounds having the formula cis and trans Pt(NH$_3$)$_2$Cl$_2$; and which reacts with ammonia to form higher ammonia containing complexes, while contacting of the crystalline cis and trans Pt(NH$_3$)$_2$Cl$_2$ with gaseous NH$_3$ at room temperature and 1 atmosphere pressure exhibits no reaction.

2. As a new composition, a material characterized by the formula:

$$PtCl_2 \cdot NH_3$$

where the ammonia is irreversibly reacted and which reacts with ammonia to form higher ammonia containing complexes and having an X-ray diffraction pattern identical to that of beta platinum chloride and distinct from that of the monoamine Pt(NH$_3$)Cl$_2$ which is prepared by the decomposition of trans Pt(NH$_3$)$_2$Cl$_2$.

3. As a new composition, an amorphous material characterized by the formula:

$$PtCl_2 \cdot 2 NH_3$$

and having the properties according to claim 1.

* * * * *